United States Patent
Masuko et al.

(10) Patent No.: US 9,553,514 B2
(45) Date of Patent: Jan. 24, 2017

(54) DC-DC CONVERTER

(71) Applicant: Seiko Instruments Inc., Chiba-shi, Chiba (JP)

(72) Inventors: Hiroyuki Masuko, Chiba (JP); Kosuke Takada, Chiba (JP); Michiyasu Deguchi, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/948,655

(22) Filed: Nov. 23, 2015

(65) Prior Publication Data

US 2016/0156264 A1    Jun. 2, 2016

(30) Foreign Application Priority Data

Nov. 27, 2014    (JP) .................................. 2014-240525

(51) Int. Cl.
  *H02M 3/156*    (2006.01)
  *H02M 3/158*    (2006.01)
  *H02M 1/36*    (2007.01)
  *H02M 1/00*    (2006.01)

(52) U.S. Cl.
  CPC .............. *H02M 3/156* (2013.01); *H02M 1/36* (2013.01); *H02M 3/158* (2013.01); *H02M 3/1588* (2013.01); *H02M 2001/0022* (2013.01)

(58) Field of Classification Search
  CPC ..... H02M 3/156; H02M 3/158; H02M 3/1588
  See application file for complete search history.

(56) References Cited

U.S. PATENT DOCUMENTS

| 2004/0080963 | A1* | 4/2004 | Grant | H02M 3/1588 363/59 |
| 2013/0187624 | A1* | 7/2013 | Wakasugi | H02M 3/158 323/282 |
| 2013/0207631 | A1* | 8/2013 | Hirakawa | H02M 3/156 323/283 |
| 2014/0062449 | A1* | 3/2014 | Qu | G05F 3/02 323/311 |
| 2014/0253079 | A1* | 9/2014 | Ding | H02M 3/156 323/283 |
| 2015/0180335 | A1* | 6/2015 | Takada | H02M 3/156 323/288 |

FOREIGN PATENT DOCUMENTS

JP    2011-055692 A    3/2011

* cited by examiner

*Primary Examiner* — Jue Zhang
*Assistant Examiner* — Lakaisha Jackson
(74) *Attorney, Agent, or Firm* — Brinks Gilson & Lione

(57) ABSTRACT

To provide a DC-DC converter which prevents overshoot from occurring in an output voltage even when a power supply voltage rises from a voltage lower than a desired output voltage of the DC-DC converter to a normal voltage. A DC-DC converter is equipped with a 100% DUTY detection circuit which detects a 100% DUTY state of a PWM comparator, a power supply voltage rise detection circuit which detects a rise in a power supply voltage, and a discharge control circuit which lowers an output voltage of an error amplifier. The DC-DC converter is configured to lower the output voltage of the error amplifier when a power supply voltage rise detection signal is outputted where a 100% DUTY state is reached and the output voltage of the error amplifier is higher than a predetermined voltage.

5 Claims, 5 Drawing Sheets

US 9,553,514 B2

DC-DC CONVERTER

RELATED APPLICATIONS

This application claims priority under 35 U.S.C. §119 to Japanese Patent Application No. 2014-240525 filed on Nov. 27, 2014, the entire content of which is hereby incorporated by reference.

BACKGROUND OF THE INVENTION

Field of the Invention

The present invention relates to a DC-DC converter which outputs a constant voltage, and more specifically to a technology of preventing overshoot of an output voltage.

Background Art

FIG. 6 is a circuit diagram of a related art DC-DC converter.

The related art DC-DC converter is comprised of a power supply terminal 101, a ground terminal 102, a reference voltage circuit 111 which outputs a reference voltage VREF, a voltage dividing circuit 112 which divides an output voltage VOUT of an output terminal 103, an error amplifier 110 which outputs a voltage VERR indicative of a result of comparison between a divided voltage VFB and the reference voltage VREF, a ramp wave generating circuit 114 which generates a ramp wave VRAMP, a PWM comparator 113 which compares the voltage VERR with the ramp wave VRAMP to output a signal PWM, an output buffer 115, an output transistor 116, and a soft start circuit 119.

The operation of the related art DC-DC converter will be described.

When a voltage VDD is applied to the power supply terminal 101, the error amplifier 110 compares the divided voltage VFB and the reference voltage VREF to output the voltage VERR. The PWM comparator 113 compares the voltage VERR and the ramp wave VRAMP and thereby outputs the signal PWM to the output buffer 115. The output buffer 115 outputs the signal PWM to the output transistor 116 under the control of an output signal of the soft start circuit 119. The soft start circuit 119 has the function of gradually raising an output when the voltage VDD is applied to the power supply terminal 101. Thus, overshoot of the output voltage VOUT of the DC-DC converter is suppressed by causing the output buffer 115 to gradually turn on the output transistor 116.

[Patent Document 1] Japanese Patent Application Laid-Open No. 2011-55692

SUMMARY OF THE INVENTION

The related art DC-DC converter, however, has the following problems.

When the power supply voltage VDD is lower than an output setting voltage of the DC-DC converter, the voltage VERR outputted from the error amplifier 110 becomes a value close to the power supply voltage VDD. Thus, the PWM comparator 113 is in a 100% DURY state, i.e., the output transistor 116 is always placed in an on state without being subjected to switching. When the power supply voltage VDD suddenly rises from this state, the output voltage VOUT of the DC-DC converter is overshot during a time in which the voltage VERR returns to a steady-state value.

The present invention has been invented to solve the above-mentioned problems. The present invention is intended to provide a DC-DC converter capable of preventing overshoot of the output voltage VOUT even though the PWM comparator 113 is placed in the 100% DUTY state.

In order to solve the related art problems, the DC-DC converter of the present invention is configured as follows:

The DC-DC converter is provided which is equipped with a 100% DUTY detection circuit detecting a 100% DUTY state of a PWM comparator, a power supply voltage rise detection circuit detecting a rise in a power supply voltage, and a discharge control circuit lowering an output voltage of an error amplifier, and which lowers the output voltage of the error amplifier when a power supply voltage rise detection signal is outputted where the 100% DUTY state is reached and the output voltage of the error amplifier is higher than a predetermined voltage.

The DC-DC converter of the present invention brings about an effect that since it is configured as described above, no overshoot occurs in an output voltage even when a power supply voltage is raised from a voltage lower than a desired output voltage of the DC-DC converter to a normal voltage.

DETAILED DESCRIPTION OF THE PREFERRED EMBODIMENTS

Figure 1:
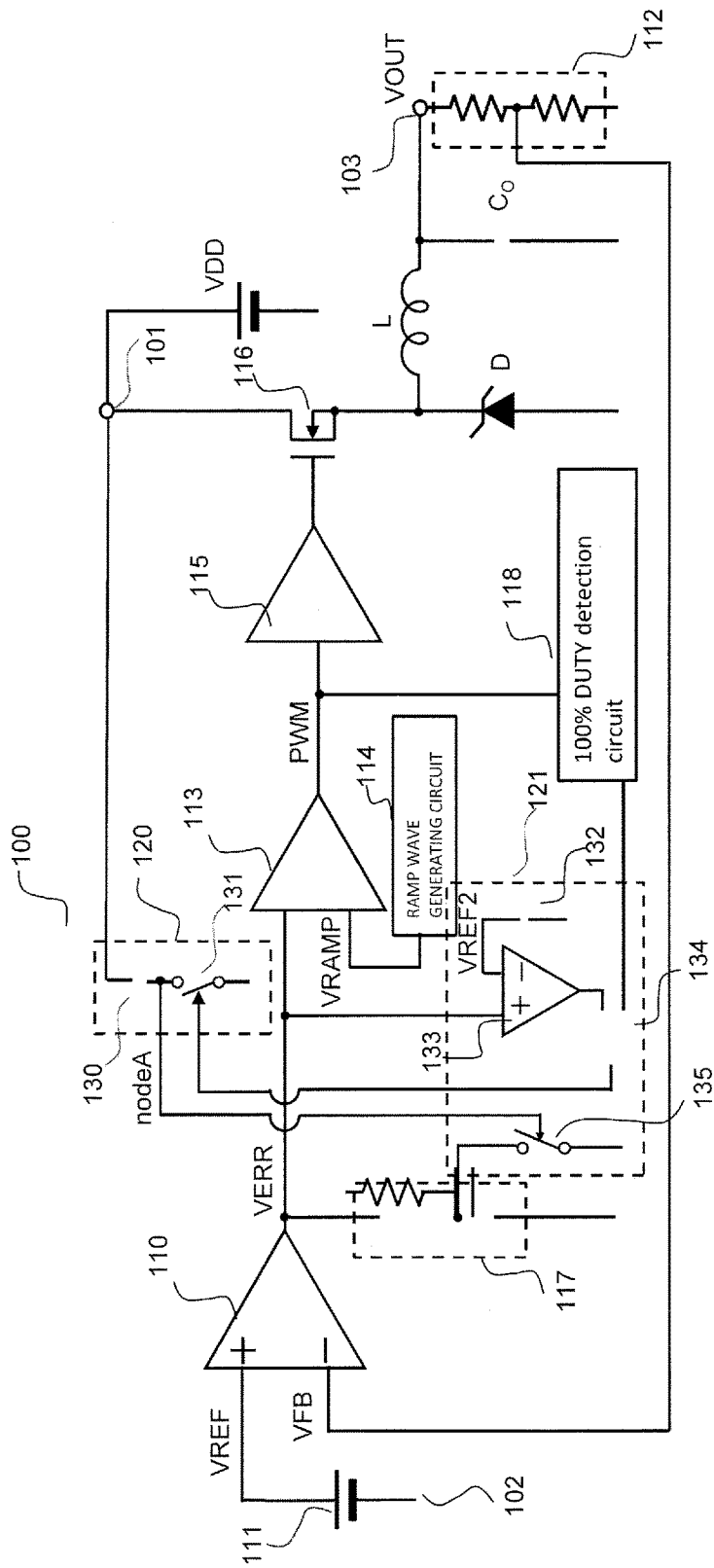
FIG. 1 is a circuit diagram of a DC-DC converter of the present embodiment.

FIG. 1 is a circuit diagram of a DC-DC converter of the present embodiment.

The DC-DC converter 100 of the present embodiment is equipped with a power supply terminal 101, a ground terminal 102, a reference voltage circuit 111 which outputs a reference voltage VREF, a voltage dividing circuit 112 which divides an output voltage VOUT of an output terminal 103, an error amplifier 110 which outputs a voltage VERR indicative of a result of comparison between a divided voltage VFB and the reference voltage VREF, a ramp wave generating circuit 114 which generates a ramp wave VRAMP, a PWM comparator 113 which compares the voltage VERR with the ramp wave VRAMP to output a signal PWM, an output buffer 115, an output transistor 116, a 100% DUTY detection circuit 118, a power supply voltage rise detection circuit 120, a discharge control circuit 121, and a phase compensation circuit 117 having a phase compensation capacitor Cc and a phase compensation resistor Rc.

The 100% DUTY detection circuit 118 has an input terminal connected to an output terminal of the PWM comparator 113, and an output terminal connected to an input terminal of the discharge control circuit 121.

The power supply voltage rise detection circuit 120 is equipped with a switch 131 and a capacitor 130 connected in series between the power supply terminal 101 and the ground terminal 102. A connection point of these is assumed to be a nodeA.

The discharge control circuit 121 is equipped with a switch 135 controlled by the voltage of the nodeA, a second reference voltage circuit 132 which generates a second reference voltage VREF2 slightly higher than a wave crest value of the ramp wave, a comparator 133 which compares the second reference voltage VREF2 and the voltage VERR, and a NAND 134 which inputs an output of the comparator 133 and a detection signal of the 100% DUTY detection circuit 118.

The switch 135 has one end connected to the ground terminal 102, and the other end connected to a connection point of the capacitor Cc and the resistor Rc of the phase compensation circuit 117. The NAND134 outputs a discharge control signal to the switch 131 of the power supply voltage rise detection circuit 120.

Figure 2:
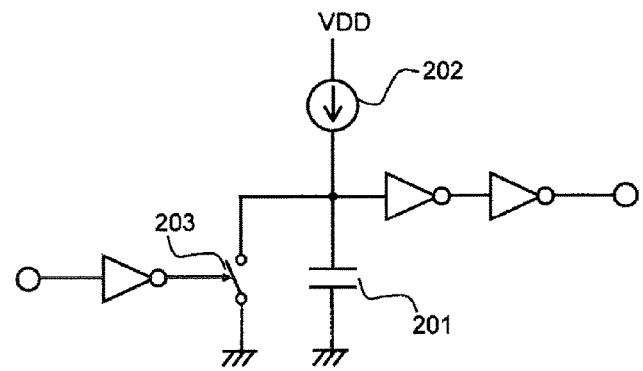
FIG. 2 is a circuit diagram illustrating one example of a 100% DUTY detection circuit.

FIG. 2 is a circuit diagram illustrating one example of the 100% DUTY detection circuit 118.

The 100% DUTY detection circuit 118 is equipped with a capacitor 201, a constant current circuit 202, and a switch 203. A control terminal of the switch 203 is an input terminal, and a connection point of the constant current circuit 202 and the switch 203 is an output terminal. The constant current circuit 202 is connected so as to charge the capacitor 201. The switch 203 is connected so as to discharge the capacitor 201.

In the 100% DUTY detection circuit 118, the capacitor 201 is charged by the constant current circuit 202, and the capacitor 201 is discharged by the switch 203. The switch 203 is controlled by the signal PWM. Thus, in a normal operating state in which the signal PWM repeats Hi and Lo, the capacitor 201 is discharged, and the output terminal maintains the state of Lo. Further, since the capacitor 201 is not discharged when the signal PMW is brought to 100% duty and maintains Hi, the output terminal outputs Hi when the voltage of the capacitor 201 exceeds the threshold value of an inversion circuit. That is, the 100% DUTY detection circuit 118 is brought into a 100% DUTY detection state.

The operation of the DC-DC converter of the present embodiment will next be described.

Figure 3:
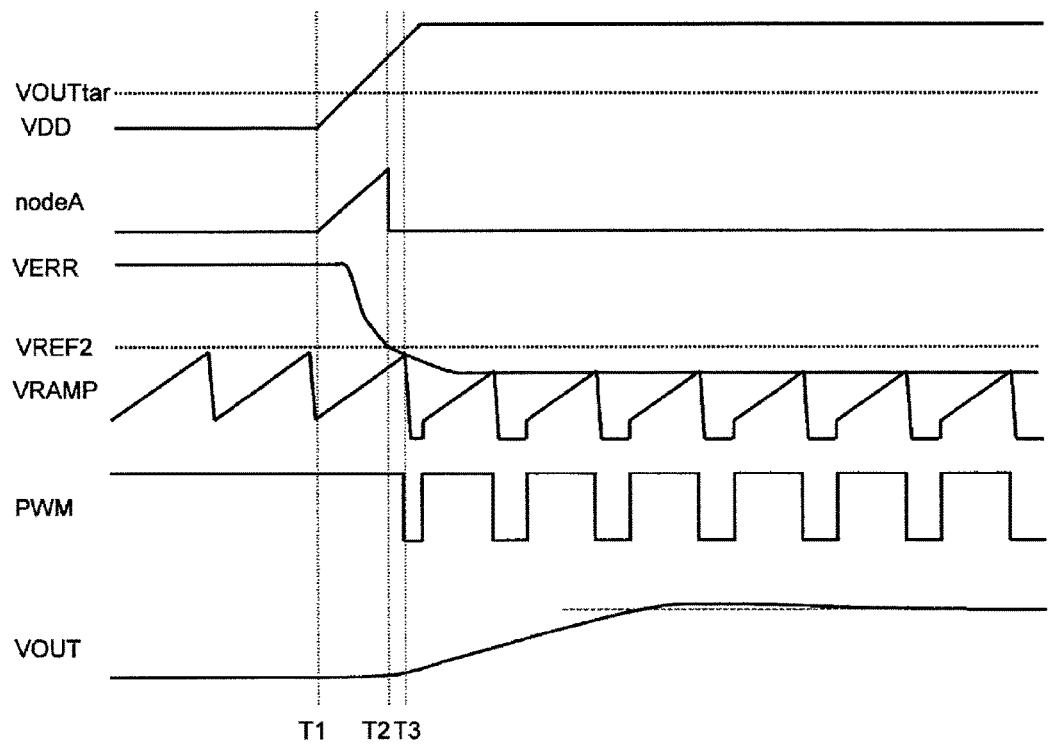
FIG. 3 is a diagram illustrating the operation of the DC-DC converter of the present invention.

FIG. 3 is a diagram illustrating the operation of the DC-DC converter of the present embodiment.

Till a time T1, the power supply voltage VDD becomes a voltage lower than a desired output voltage VOUTtar of the DC-DC converter, and the divided voltage VFB becomes a voltage lower than the reference voltage VREF. Since the output voltage VERR of the error amplifier 110 is Hi and does not cross the ramp wave VRAMP, the signal PWM maintains a Hi state. Thus, since the output transistor 116 is in an on state, the output voltage VOUT becomes the power supply voltage VDD. At this time, the 100% DUTY detection circuit 118 is in a 100% DUTY detection state and the output thereof becomes Hi. Further, since the voltage VERR is higher than the second reference voltage VREF2 corresponding to an inversion input of the comparator 133, the output of the comparator 133 is Hi. Thus, the output of the NAND134 with the output of the 100% DUTY detection circuit 118 and the output of the comparator 133 taken to be inputs becomes Lo and hence the switch 131 of the power supply voltage rise detection circuit 120 is kept off. Further, the nodeA maintains a ground potential when the switch 131 is on.

When the power supply voltage VDD gradually rises between the time T1 and a time T2, the voltage of the nodeA of the power supply voltage rise detection circuit 120 rises following the power supply voltage VDD by coupling of the capacitor 130. With the rise in the voltage of the nodeA, the switch 135 of the discharge control circuit 121 is turned on so as to follow the voltage of the nodeA to discharge an electric charge of the phase compensation capacitor Cc, thereby lowering the voltage VERR.

When the voltage VERR becomes a voltage lower than the reference voltage VREF2 at the time T2, the output of the comparator 133 becomes Lo. The output of the NAND134 becomes Hi to turn on the switch 131 of the power supply voltage rise detection circuit 120, so that the nodeA is brought to the ground potential. Thus, in the discharge control circuit 121, the switch 135 is turned off to stop the discharge of the phase compensation capacitor Cc. That is, the error amplifier 110 outputs the voltage VERR corresponding to the input divided voltage VFB.

At a time T3, the voltage VERR crosses the ramp wave VRAMP, and the output PWM of the PWM comparator 113 becomes a rectangular wave, so that the switching operation of the DC-DC converter is started. Since the voltage VERR becomes a value close to a normal value during the rise in the power supply voltage VDD, the output voltage VOUT relatively gently approaches the value of a desired output voltage VOUT. Thus, even if the power supply voltage VDD is restored to the normal value, no overshoot occurs in the output voltage VOUT.

According to the DC-DC converter of the present embodiment, as described above, it is possible to prevent overshoot of the output voltage VOUT even when the power supply voltage VDD is restored from the voltage lower than the desired output voltage of the DC-DC converter, i.e., the state in which the PWM comparator 113 is in the 100% DUTY state to the normal power supply voltage.

Figure 4:
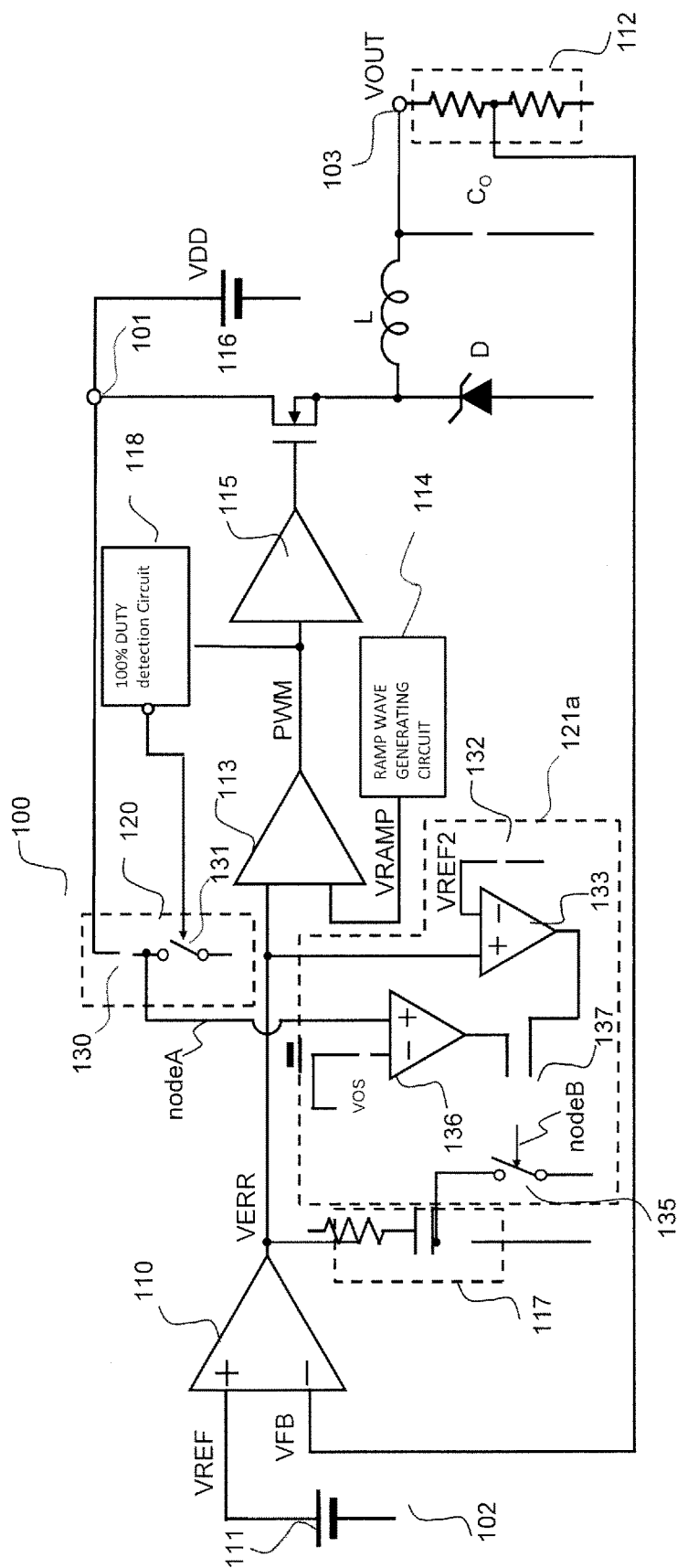
FIG. 4 is a circuit diagram illustrating another example of the DC-DC converter of the present embodiment.

FIG. 4 is a circuit diagram illustrating another example of the DC-DC converter of the present embodiment.

The DC-DC converter 100 of FIG. 4 is equipped with a power supply terminal 101, a ground terminal 102, a reference voltage circuit 111 which outputs a reference voltage VREF, a voltage dividing circuit 112 which divides an output voltage VOUT of an output terminal 103, an error amplifier 110 which outputs a voltage VERR indicative of a result of comparison between a divided voltage VFB and the reference voltage VREF, a ramp wave generating circuit 114 which generates a ramp wave VRAMP, a PWM comparator 113 which compares the voltage VERR with the ramp wave VRAMP to output a signal PWM, an output buffer 115, an output transistor 116, a 100% DUTY detection circuit 118, a power supply voltage rise detection circuit 120, a discharge control circuit 121a, and a phase compensation circuit 117.

The 100% DUTY detection circuit 118 has an input terminal connected to an output terminal of the PWM comparator 113, and an inversion output terminal connected to a control terminal of a switch 131 of the power supply voltage rise detection circuit 120.

The discharge control circuit 121a is equipped with a second reference voltage 132 which generates a second reference voltage VREF2 slightly higher than a wave crest value of the ramp wave, a comparator 133 which compares the second reference voltage 132 and the voltage VERR, a comparator 136 having a non-inversion input terminal connected to a nodeA, and an inversion input terminal having an offset voltage Vos, which is connected to the ground terminal 102, an AND 137 which performs an AND operation on the output of the comparator 133 and the output of the comparator 136, and a switch 135 controlled by an output nodeB of the AND137.

The operation of the DC-DC converter of FIG. 4 will next be described.

Figure 5:
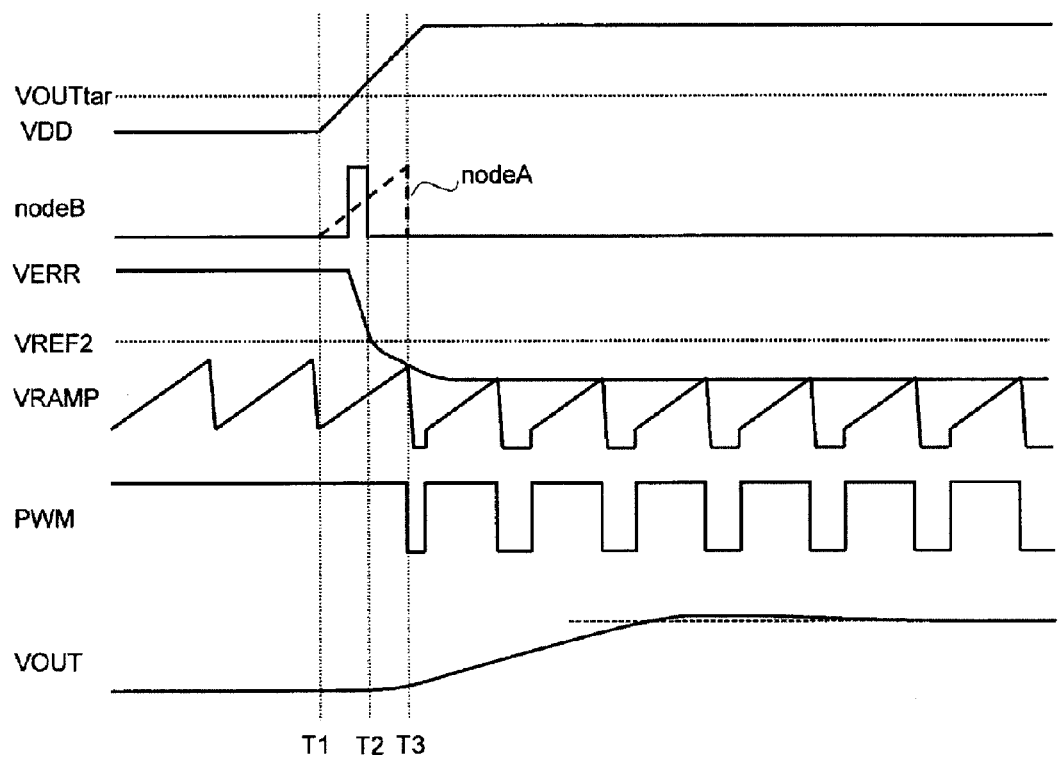
FIG. 5 is a diagram illustrating the operation of the DC-DC converter according to FIG. 4.
Figure 6:
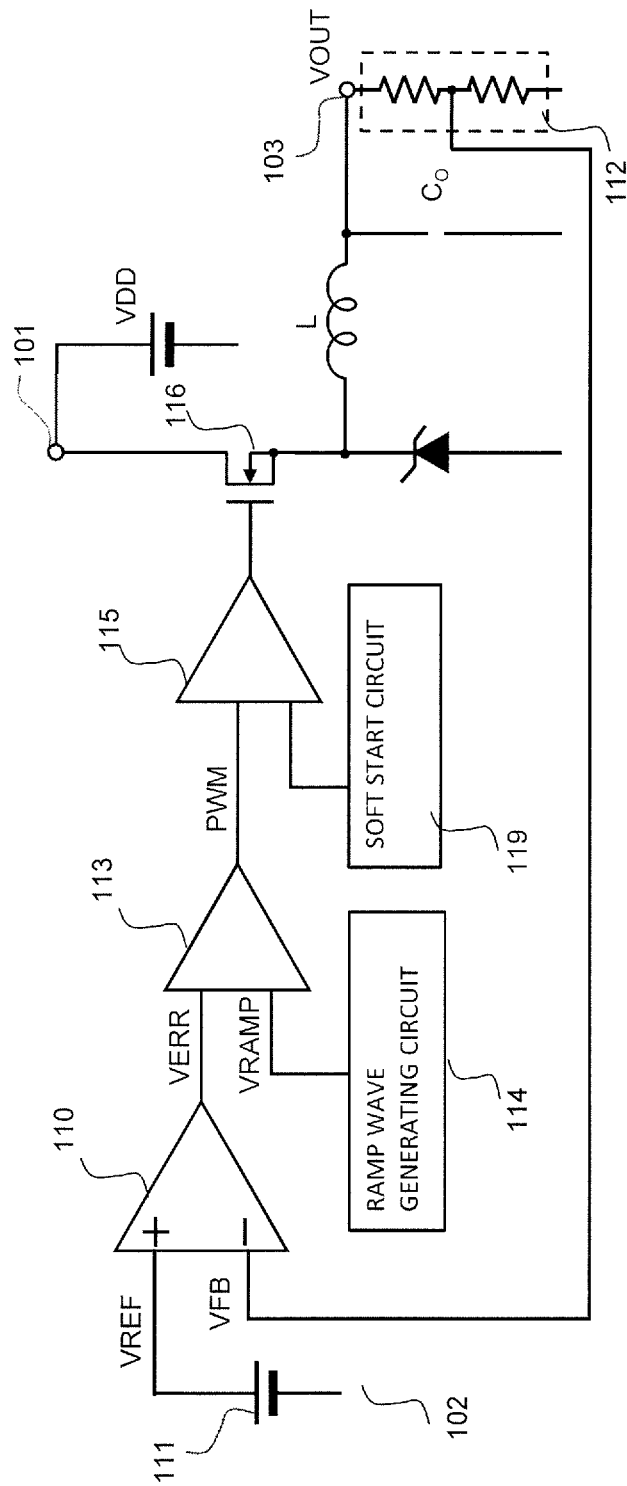
FIG. 6 is a circuit diagram of a related art DC-DC converter.

FIG. 5 is a diagram illustrating the operation of the DC-DC converter according to FIG. 4.

Till a time T1, a power supply voltage VDD becomes a voltage lower than a desired output voltage VOUTtar of the DC-DC converter, and the divided voltage VFB becomes a voltage lower than the reference voltage VREF. Since the output voltage VERR of the error amplifier 110 is Hi and does not cross the ramp wave VRAMP, the signal PWM maintains a Hi state. Thus, since the output transistor 116 is in an on state, the output voltage VOUT becomes the power supply voltage VDD. At this time, the 100% DUTY detection circuit 118 is in a 100% DUTY detection state and its inversion output becomes Lo. The switch 131 of the power supply voltage rise detection circuit 120 is turned off in response to an output signal of the 100% DUTY detection circuit 118. Further, the nodeA maintains a voltage grounding potential when the switch 131 is on. That is, the output of the comparator 136 of the discharge control circuit 121a becomes Lo. Further, since the voltage VERR is higher than the second reference voltage VREF2 corresponding to an inversion input of the comparator 133, the output of the comparator 133 is Hi. Thus, the output nodeB of the AND137 is Lo, and the switch 135 is turned off.

When the power supply voltage VDD gradually rises between the time T1 and a time T2, the voltage of the nodeA of the power supply voltage rise detection circuit 120 rises following the power supply voltage VDD by coupling of a capacitor 130. When the voltage of the nodeA rises and becomes higher than an offset voltage Vos of the comparator 136, the output of the comparator 136 becomes Hi. Further, the output of the comparator 133 maintains Hi. That is, the output nodeB of the AND137 becomes Hi. Thus, since the switch 135 of the discharge control circuit 121 a is turned on, an electric charge of a phase compensation capacitor Cc is discharged to lower the voltage VERR.

When the voltage VERR becomes a voltage lower than the reference voltage VREF2 at the time T2, the output of the comparator 133 becomes Lo. The output nodeB of the AND137 becomes Lo and the discharge of the phase compensation capacitor Cc is stopped. That is, the error amplifier 110 outputs the voltage VERR corresponding to the divided voltage VFB inputted thereto.

At a time T3, the voltage VERR crosses the ramp wave VRAMP, and the output PWM of the PWM comparator 113 becomes a rectangular wave, so that the switching operation of the DC-DC converter is started. Since the voltage VERR becomes a value close to a normal value during the rise in the power supply voltage VDD, the output voltage VOUT relatively gently approaches the value of a normal output voltage VOUT. Thus, even if the power supply voltage VDD is restored to a normal value, no overshoot occurs in the output voltage VOUT.

According to the DC-DC converter of the present embodiment, as described above, it is possible to prevent overshoot of the output voltage VOUT even when the power supply voltage VDD is restored from the voltage lower than the desired output voltage of the DC-DC converter, i.e., the state in which the PWM comparator 113 is in the 100% DUTY state to the normal voltage.

Incidentally, although the present invention has been described using the circuits for the voltage mode DC-DC converter, the present invention can be applied even in the case of a current mode DC-DC converter and can bring about a similar effect. In a current mode, the ramp wave VRAMP described in the form of the triangular wave in the drawing for the operation description of FIG. 3 is a voltage obtained by feeding back current of the output transistor 116.

What is claimed is:
1. A DC-DC converter comprising:
an error amplifier which amplifies a difference between a divided voltage obtained by dividing a voltage outputted from an output transistor and a reference voltage to output a voltage VERR;
a ramp wave generating circuit which generates a ramp wave;
a PWM comparator which compares the voltage VERR and the ramp wave and thereby outputs a signal PWM;
a 100% DUTY detection circuit which detects that the signal PWM is brought to 100% DUTY, and outputs a 100% DUTY detection signal;
a phase compensation capacitor and a phase compensation resistor provided at an output terminal of the error amplifier;
a power supply voltage rise detection circuit which detects a rise in a power supply voltage; and
a discharge control circuit which discharges an electric charge of the phase compensation capacitor in response to an output signal of the power supply voltage rise detection circuit.

2. The DC-DC converter according to claim 1, wherein the discharge control circuit outputs a discharge control signal when the 100% DUTY detection signal is inputted when the voltage VERR is higher than a predetermined voltage.

3. The DC-DC converter according to claim 2, wherein the power supply voltage rise detection circuit is equipped with a capacitor having one end connected to a power supply terminal, and a switch having one end connected to the other end of the capacitor and the other end connected to a ground terminal, and being controlled by the discharge control signal, and
wherein the power supply voltage rise detection circuit provides a connection point of the switch and the capacitor as an output terminal.

4. The DC-DC converter according to claim 1, wherein the power supply voltage rise detection circuit is equipped with a capacitor having one end connected to a power supply terminal, and a switch having one end connected to the other end of the capacitor and the other end connected to a ground terminal, and being controlled by the 100% DUTY detection signal, and
wherein the power supply voltage rise detection circuit provides a connection point of the switch and the capacitor as an output terminal.

5. The DC-DC converter according to claim 4, wherein the discharge control circuit discharges the electric charge of the phase compensation capacitor when a detection signal is inputted from the power supply voltage rise detection circuit when the voltage VERR is higher than a predetermined voltage.

* * * * *